Jan. 31, 1961
H. G. RICH
2,969,802
DIRECT OPERATED RESET PILOT
Filed June 30, 1958
3 Sheets-Sheet 1
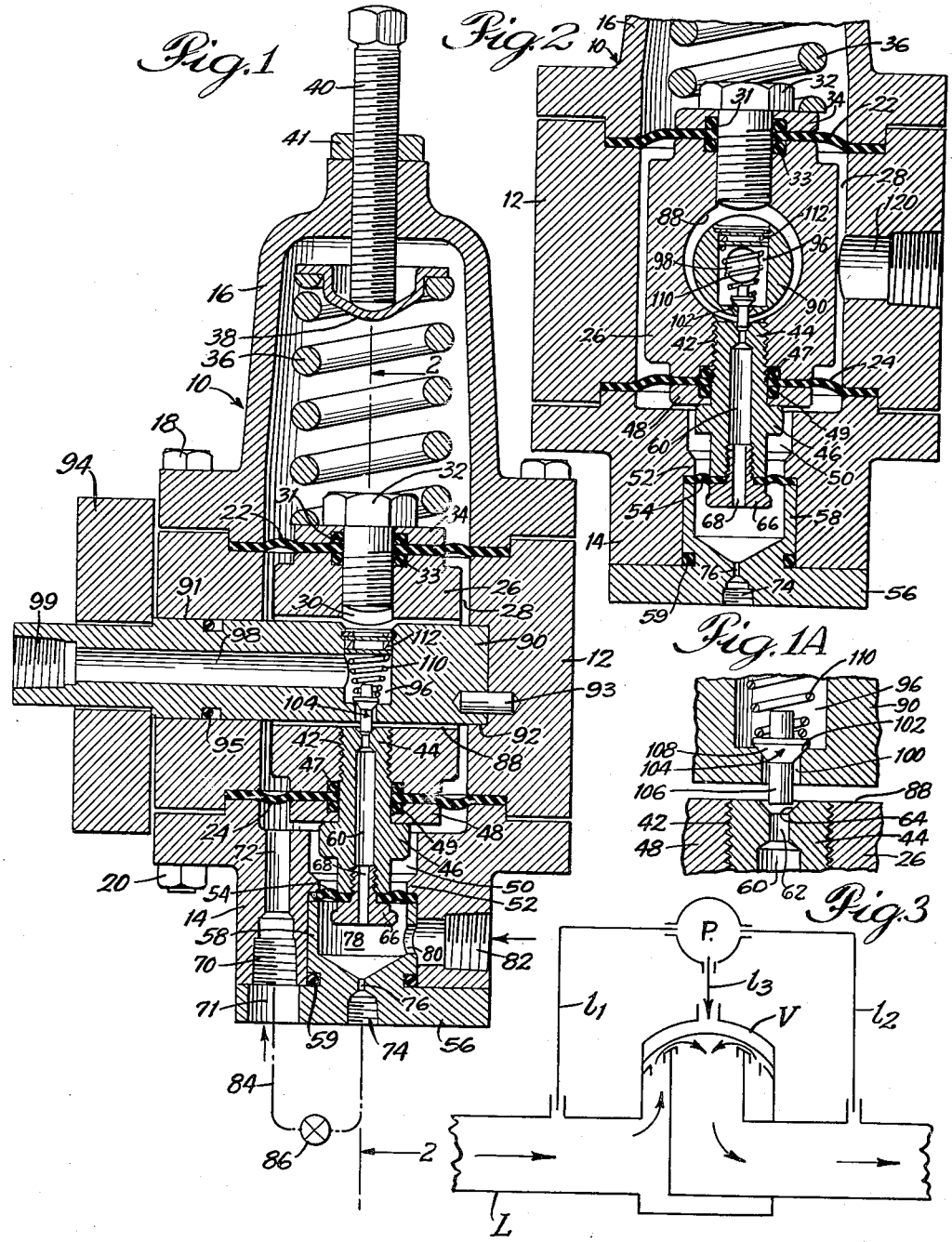
INVENTOR:
Herbert G. Rich,
BY Bair, Freeman & Molinare
ATTORNEYS.

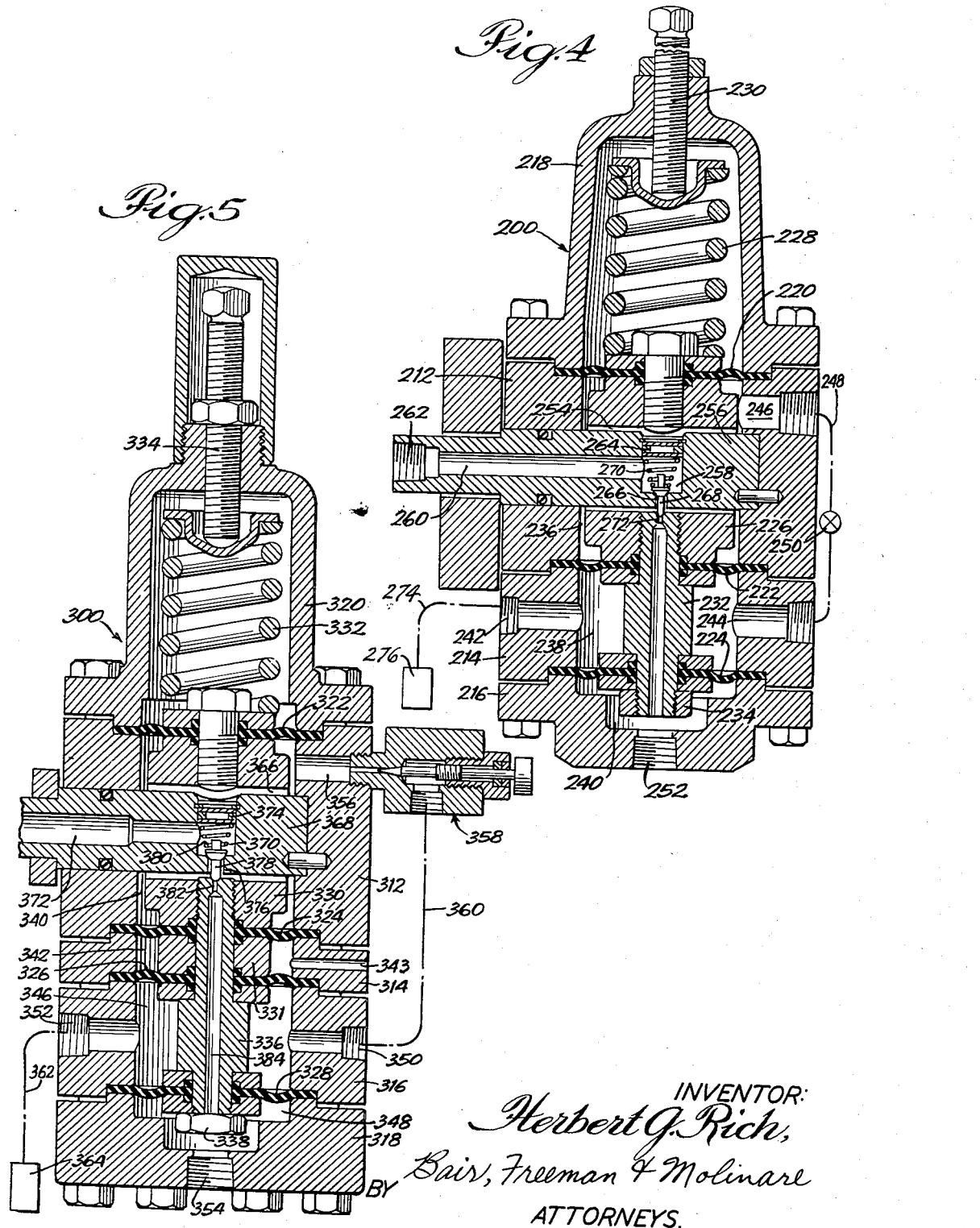

Jan. 31, 1961

H. G. RICH 2,969,802

DIRECT OPERATED RESET PILOT

Filed June 30, 1958

INVENTOR:
Herbert G. Rich,
BY Bair, Freeman & Molinare
ATTORNEYS.

United States Patent Office 2,969,802
Patented Jan. 31, 1961

2,969,802

DIRECT OPERATED RESET PILOT

Herbert G. Rich, Marshalltown, Iowa, assignor to Fisher Governor Company, a corporation of Iowa Filed June 30, 1958, Ser. No. 745,416

8 Claims. (Cl. 137—85)

This invention relates generally to pilot devices for use with automatic valve controller equipment, and more particularly to a novel direct-operated reset pilot.

In the gas distribution industry, it is necessary to "even out" the pressures of gas distributed to the ultimate consumers, so that equipment tied to the gas lines will not be subject to fluctuations in the main supply pressure of the gas. In order to obtain very steady regulation of this pressure, and to promote operating efficiency, the reduction from transmission line pressures down to household pressures may be done in a number of steps by pressure-reducing gas regulator valves. It is undesirable, however, to employ a mechanism which will exhaust gas to the atmosphere, because such equipment is often located in pits below the street level where venting is difficult and hazardous, or in residential areas where gas odors cannot be tolerated. Further, because of the remote and often unattended locations of gas pressure regulating equipment, it is impractical to use anything but the upstream gas to operate the automatic valve devices. It is desirable, therefore, to employ pilot mechanisms, for effecting the required main valve operations, which will use the upstream gas as its operating fluid, and which will bleed the exhaust gas intra-system to the downstream pressure line.

In order to maintain as even an operating pressure as possible for the regulator valve, it is necessary for a pilot device to have a relatively narrow proportional band; that is, the amount of pressure change downstream of the regulator which is required to fully actuate the main valve from a full-closed to a wide-open position should be only a few p.s.i. in range. The narrower the proportional band attempted, however, the more critical the problem of stability becomes, particularly with regulators of the type wherein the main valve opening is sensitive to both inlet and outlet pressures.

Therefore, in order to prevent the main valve from being violently thrown open and closed by minor fluctuations of the downstream pressure, which might be cyclic, it is desired to provide a pilot which will not be sensitive to rapid changes of downstream pressure, and which will instead be temporarily desensitized to them.

Although resetting pilot mechanisms have been known in the instrumentation field, such devices have not been direct-operated in that the reset chamber and restriction are not in fluid communication with the controlled pressure system, but are instead operated by an independent instrument fluid system. It is the primary purpose of the present invention, therefore, to utilize the fluid being controlled by the main valve of a controlled pressure system for effecting the automatic operation of a direct-operated reset pilot mechanism to control the regulating action of the main valve.

It is another object of this invention to provide a direct-operated reset pilot capable of achieving stable control of a main valve structure while maintaining a relatively narrow proportional band characteristic.

It is a further object of this invention to provide a direct-operated reset pilot operative to determine and then automatically supply the required power to operate a main valve, wherein solely the upstream pressure of the controlled pressure system is utilized, thereby eliminating all need for auxiliary pressure reducing devices, sensitive controls, and separate pressure fluids.

It is still another object of this invention to provide a direct operated reset pilot which permits the bleeding of excess fluid to the downstream side of the controlled pressure system for re-use.

It is yet a further object of this invention to provide an automatic controller mechanism having a very narrow proportional band characteristic which can be broadened or desensitized under conditions of changing control pressure.

Further objects and advantages of this invention will become apparent as the following description proceeds, and the features of novelty which characterize this invention will be pointed out with particularity in the claims annexed to and forming part of this specification.

A preferred embodiment of the invention is shown in the accompanying drawing, in which:

Figure 1 is a cross sectional view of a direct operated reset pilot device embodying the principles and features of the present invention, and constructed in accordance with a first embodiment thereof.

Figure 1A is a fragmentary cross sectional view on an enlarged scale showing the intermittent bleed valve means of Figure 1 in another operative position.

Figure 2 is a cross sectional view taken substantially as indicated along the line 2—2 on Figure 1, and showing still another operative position of the intermittent bleed valve means.

Figure 3 is a diagrammatic view illustrating the co-operative pressure flow relation between a pilot device constructed in accordance with the present invention and a diaphragm-loaded type of flow controller.

Figures 4, 5 and 6 are cross sectional views similar to Figure 1, each illustrating, respectively, modified embodiments of the present invention.

Figure 6:
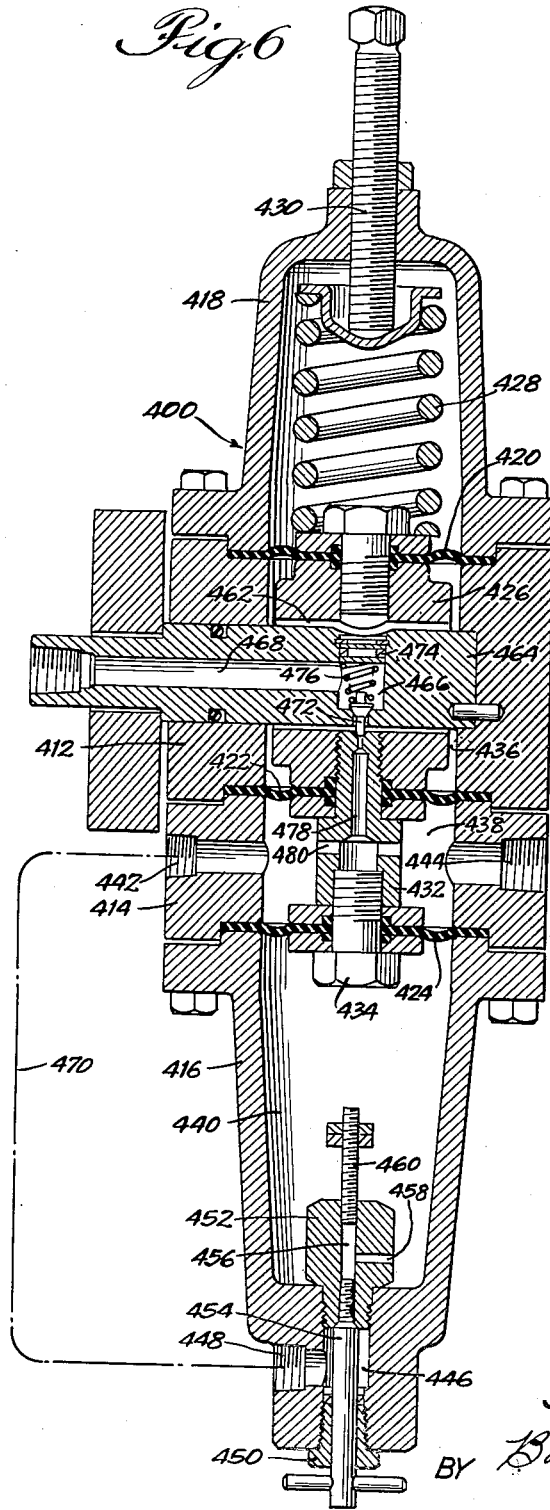

Referring now more particularly to Figures 1 and 2 of the drawing, I have illustrated a direct-operated reset pilot 10 constructed in accordance with a first embodiment of the present invention. The device 10 comprises a main body 12 of centrally hollow form, and having an end housing 14 and an end cover 16 secured thereto by bolt means 18 and 20 to provide a unitary valve body assembly. A pair of large diaphragms 22 and 24 of suitable resilient material are fixedly disposed between internal shoulder portions at the engaged interfaces of the main body 12 and its end body 14 and end cover 16, respectively. The diaphragms 22 and 24 serve to movably carry a yoke body 26 within the main body 12. In this way, a pressure chamber 28 is defined between the diaphragms 22 and 24, surrounding the yoke body 26.

The yoke body 26 is formed with a threaded bore 30 at its one end to receive a diaphragm assembly bolt 32. The diaphragm 22 overlies the end of the yoke body 26 and is centrally apertured in alignment with the bore 30. A washer 34 overlies the diaphragm 22. In this way, the bolt 32 serves to rigidly assemble the diaphragm 22 to the yoke body 26. O-rings 31 and 33 insure a fluid-tight assembly of the parts.

A loading spring 36 is seated upon the washer 34, and is engaged at its opposite end by an abutment cap 38 into which the inner end of a threaded adjusting bolt 40 extends. The bolt 40 is threadedly supported by the end cover 16, and is provided with a cooperating lock nut 41. In this way, an adjustable pressure load may be applied through the spring 36 to the diaphragm 22.

The other end of the yoke body 26 is formed with a bore 42 which receives a threaded stem portion 44 of a hollow plug 46. A washer 48 and O-rings 47 and 49 cooperate with the plug 46 to effect a fluid-tight assembly of the diaphragm 24 to the other end of the yoke body 26 in substantially the same manner as the attachment of the diaphragm 22. The portion of the plug 44 outwardly of the yoke body 26 is received within a pressure chamber 50 defined by the end body 14. An internal shoulder 52 provides an annular support surface for a diaphragm 54 of relatively small size in comparison with the diaphragms 22 and 24. An end cap 56 provides a collar portion 58 which cooperates with the shoulder 52 to fixedly mount the diaphragm 54 across the chamber 50. An O-ring 59 insures fluid-tight assembly of the end cap 56 with the end body 14. The hollow plug 46 is formed with a longitudinal passage 60 therethrough. The passage 60 provides at its one end a restricted orifice 62 terminating in a valve seat 64, and is threaded at its other end to receive the threaded stem of an orifice cap 66. The cap 66 extends through a central opening in the small diaphragm 54, and provides a restricted passage 68 for flow therethrough into the passage 60. The cap 66 and the adjacent end of the plug 46 cooperate with the small diaphragm 54 to maintain a fixed assembly of parts.

The end body 14 is provided with a threaded bore 70 in alignment with a corresponding inlet opening 71 of the end cap 56. A flow passage 72 communicates with the bore 70 with pressure chamber 50 at the acting surface of the large diaphragm 24 opposite the chamber 28. A threaded bore 74 in the end cap 56 communicates through a restricted orifice 76 with a control pressure chamber 78 defined within the collar 58 and facing the acting surface of the small diaphragm 54 opposite the pressure chamber 50. A port 80 in the collar 58 provides flow communication between the control pressure chamber 78 and a threaded inlet bore 82 formed in the end body 14. A conduit 84 and an adjustable reset valve 86 have been diagrammatically illustrated in Figure 1, and provide means for regulated flow between the bores 74 and 70. The reset valve 86 may be of any suitable type, such as a conventional needle valve, and its details do not form a part of this invention.

The yoke body 26 is particularly formed with a relatively large transverse bore 88, which extends generally at right angles to the longitudinal axis of the bores 30 and 42 thereof. An elongated hollow stem member 90 extends through a bore 91 of the center housing 12 in slidable engagement and relatively fixed orientation therewith, and passes through the bore 88 of the yoke body 26. A recess 92 is formed in the center housing 12 to receive the inner end of the stem 90, and a key 93 insures a fixed assembly. A lock cap 94 is provided to prevent withdrawal of the stem 90. An O-ring 95 is provided to insure a fluid-tight seal within the bore 91. It is important that the size of the bore 88 be sufficiently larger than the fixed hollow stem 90 so as to permit a substantial degree of freedom of reciprocatory movement of the yoke body 26 along its longitudinal axis.

An operating chamber 96 is formed by the hollow stem 90, and communicates with an elongated passage 98 which extends outwardly to a threaded inlet bore 99. The operating chamber 96 extends transversely through the body of the stem 90, and terminates at its one end in a restricted passage 100 which defines an inner valve seat 102, as best seen in Figure 1A of the drawing. An intermittent bleed valve 104, having a reduced stem portion 106 and an enlarged head portion 108, is disposed within the passage 100 for sealing cooperation between the valve head 108 and the valve seat 102. A loading spring 110 engages the valve 104 at its one end and abuts against a sealing plug assembly 112 at its other end. In this way, the valve 104 is biased in a normally closed position, thereby precluding fluid flow from the operating chamber 96 into the bore 88 and pressure chamber 28. The free end of the valve stem 106 is adapted to sealingly cooperate with the valve seat 64 of the hollow plug 44. In this way, the valve 104 is adapted to perform a double-valving action with the two valve seats 64 and 102.

A comparison of Figures 1, 1A and 2 will serve to indicate the double-valving action of the valve member 104 as the yoke body 26 is reciprocally moved relative to the fixed hollow stem 90 by the pressure response of diaphragms 22 and 24. For example, in Figure 1, the valve 104 is shown in valve-closed relation with both the seat 102 and the seat 64; in Figure 2, the yoke body 26 is shown in a position shifted upwardly relative to its position of Figure 1, whereby the valve stem 106 effects closure with the valve seat 64 while its head 108 is in an open position to permit flow through the valve seat 102; and in Figure 1A the valve 104 is shown in closed relation with the valve seat 102 but in open relation with the valve seat 64, as will occur when the yoke body 26 is shifted downwardly relative to its position of Figure 1.

As seen in Figure 2, a loading pressure outlet bore 120 providing a threaded opening is formed in the center housing 12 for conducting pressure fluid from the chamber 28 outwardly to a main valve device to be controlled.

The practical operation of the particular pilot embodiment 10 thus far described in connection with Figures 1 to 2 of the drawing will now be set forth. For this purpose, reference is first made to Figure 3 of the drawing which illustrates in a diagrammatic form the flow pattern between a pilot control device P, such as the pilot 10 of Figures 1 to 2, and a main valve or regulator device V which is operated by the control pressure output of the pilot P. The main valve V is shown in control relation with a fluid line L leading from a source of supply to a source of use or demand, as indicated by flow arrows. For purposes of illustration, the valve V has been diagrammatically shown in the form of a dome-loaded type of diaphragm valve structure of the type shown and described in detail in my co-pending application Serial No. 528,306, filed August 15, 1955, now Patent No. 2,877,791. An upstream pressure line L1 communicates the main line L, upstream pressure of the valve V, with the pilot P. A downstream pressure line L2 similarly communicates the main line pressure downstream of the valve V with the pilot P. The loading pressure output of the pilot P directly communicates with the valve V by means of a line L3.

If the device 10 is considered as the pilot P, the line L1 will be coupled with the inlet bore 99; the line L2 will be coupled with the inlet bore 82; and the line L3 will be coupled with the outlet bore 120. The primary control pressure is introduced at the inlet bore 82 into the pilot 10 from the downstream side of the main valve V. The control pressure will be immediately operative within the chamber 78 against the small diaphragm 54. After a substantial time delay, this same pressure will bleed through the fixed restricted orifice 76, and through the flow conducting means 74, 86, 84, 71, 70 and 72, to the pressure chamber 50 and against the large diaphragm 24. By selecting a relatively small opening position for the reset valve 86, a correspondingly long time delay for pressure equalization will result, although it should be noted that the pilot device would be inoperative if the reset valve 86 were completely closed. Correspondingly larger positions of opening adjustment of the reset valve 86 will serve to enable predetermined regulation of the desired extent of time delay.

The adjustable loading spring 36 serves to pressure load the diaphragms 22 and 24, and the yoke body 26 carried thereby. The passageway 98 of the hollow stem 90 serves to introduce the main line upstream pressure to the operating chamber 96 within the hollow stem 90. Since the pressure between the diaphragm 22 and 24 within the chamber 28 will effect a movement of the yoke body 26 against the loading spring 36, it is important that the size of the bore 88 be predetermined so as to enable the required freedom of movement of the yoke body 26 relative to the fixed hollow stem 90.

It will be apparent that any sudden change in the control or downstream demand pressure will result in an immediate response over the effective area of the relatively small diaphragm 54. In order for this changed or "new" control pressure within the chamber 78 to be fully effective upon the pilot device, however, it must bleed through the orifice 76 and the adjustable reset valve 86 to bring the pressure within the chamber 50, which operates against the large diaphragm 24, up to this new control pressure. Only when the new control pressure is bled long enough through the reset valve 86, so that the pressure in chamber 50 is equal to it, will the pilot control valve 104 stabilize at a constant opening and flow pressure for effecting pilot operation.

The relation between the two valve seats 102 and 64, for cooperation with the double acting intermittent bleed valve 104, is an important feature of the invention. The valve seat 64 is fixed relative to the movable yoke body 26, since it is essentially formed as a portion thereof, and it communicates through the passages 62, 60 and 68 with the chamber 78. The valve seat 102 is fixed relative to the stationary hollow stem 90, since it is formed integrally therewith, and it communicates through the operating chamber 96 with the inlet passage 98.

When the control pressure (or the pressure within the chamber 78) is balanced with the volume chamber pressure (or the pressure within the chamber 50), the small diaphragm 54 will be ineffective. The main valve downstream pressure will then be directly effective against the large diaphragm 24 and will cause a shifting of the yoke body 26 against the normal bias of the loading spring 36. Such movement of the yoke body 26 will carry the intermittent bleed valve 104 with it against the bias of spring 110 so as to maintain a sealing closure of its stem 106 upon the valve seat 64, while at the same time effecting an opening of its head 108 away from the valve seat 102. This action will permit the main line upstream pressure to pass from the inlet passage 98 and the operating chamber 96, through the passage 100 into the bore 88 and the chamber 28. The changed pressure within the chamber 28 is then transmitted to the main valve for performing a main valve operating function.

As the pressure within the chamber 28 rises, the yoke body 26 will tend to effect a return movement in response to the normal loading force of the spring 36, resulting in a re-seating of the valve head 108 upon the seat 102. Still further movement, where the control pressure is relatively low, will result in an opening of the valve stem 106 away from the valve seat 64, enabling the pressure within the chamber 28 to vent to the downstream side of the main valve through the passage 60 and the inlet 82.

One of the highly important features of this invention, therefore, is the use of the small diaphragm 54 for effecting a very slight pressure response movement of the yoke body 26, prior to the transmission of a full pressure force by the diaphragm 24. The intermittent bleed valve 104 contributes a highly important cooperating feature by regulating the output pressure for loading the main valve from the chamber 28.

It will be apparent that the pilot device 10 is basically a control mechanism having a very narrow proportional band characteristic which can be broadened or desensitized under conditions of changing control pressure. The positioning action of an automatic controller device is generally defined as that in which there is a predetermined relation between the value of the controlled variable and the position of a final control element. When there is a continuous linear relation between the value of the controlled variable and the position of the final control element, such action is generally termed proportional-position action. In adjusting such automatic controller action, the proportional band is generally defined as the range of values of the controlled variable which correspond to the full operating range of the final control element. The reset rate, as it is applied to proportional plus reset controller action, is defined as the number of times per minute that the effect of the proportional-position action upon the final control element is repeated in relation to the rate of motion of the final control element. In applying this terminology to the operation of the pilot 10 of the present invention, the achievement of a very narrow proportional band characteristic will be apparent.

It will now be understood that a rising control pressure is transmitted from the downstream side of a main valve V, through the line L2 and pilot inlet bore 82, to the chamber 78 and the small diaphragm 54 of the pilot 10. A relatively small valving force will result immediately. In this way, there is a desensitization or broadening of the control band of the pilot device. As the new increased control pressure within the chamber 78 is equalized by a corresponding pressure increase in the chamber 50, at a rate regulated by the restricted bleed flow through the restriction 76 and the reset valve 86, a full force will be transmitted to the larger diaphragm 24, and the pilot device will return to its original control response characteristics, thereby accomplishing reset.

In Figure 4 of the drawing I have illustrated a modified structural embodiment of the present invention. The pilot structure is designated generally at 200, and corresponds closely in principle and function with the pilot device 10 of Figures 1 to 2 of the drawing. Whereas the pilot device 10 performs its desensitizing action in the downstream or control pressure system, the pilot device of Figure 4 accomplishes the same desensitizing function with respect to pilot regulation but performs it in the loading pressure system. The pilot device 200 obtains a small thrust in response to a change in downstream or control pressure by utilizing the net force resulting from differential diaphragm areas.

The pilot 200 comprises a main body 212, a supplemental body member 214, an end body member 216 and an end cover 218, all fixedly assembled to define a unitary valve body structure. The assembled body members serve to fixedly support three relatively large diaphragms 220, 222 and 224. The effective operating area of the diaphragm 222 is selected so as to be slightly larger than the corresponding areas of the diaphragms 220 and 224 at each side thereof.

A yoke body 226 is movably supported by the diaphragms 220 and 222. A loading spring 228 having an adjusting bolt 230 provides a predetermined and variable loading force for the yoke body 26. A hollow plug 232 and an end cap 234 effect assembly between the yoke body 226 and the diaphragm 224 while providing flow communication therethrough. In this way, a plurality of pressure chambers 236, 238 and 240 are defined intermediate the respective diaphragms.

The body member 214 is formed with threaded bores 242 and 244. The main body 212 is formed with a threaded bore 246. It will be noted that a cross sectional view taken at right angles to the plane of Figure 4 would reveal an additional threaded bore providing a loading pressure outlet from the chamber 226, in the same manner as the bore 120 of the pilot device 10. A conduit 248 and a reset valve 250 of the adjustable restriction type provide bleed-flow communication between the pressure chambers 236 and 238. The end body 216 provides a threaded bore 252 for inlet flow of the control pressure fluid to the pressure chamber 240 and against the diaphragm 224.

The yoke body 226 is formed with a transverse bore 254 through which extends a hollow stem 256. The size of the bore 254 permits substantial longitudinal movement of the yoke body 226 relative to the hollow stem 256, which is fixedly secured within the main body 212. The hollow stem 256 defines an operating chamber 258 and an inlet passage 260, terminating outwardly in a threaded bore 262. The chamber 258 receives a closure plug assembly 264 in fluid-tight relation at its one end and provides a restricted passage 266 at its other end for flow into the bore 254 and chamber 236. A double-action intermittent bleed valve 268 is normally biased in flow-closed relation within the passage 266 by means of a biasing spring 270. An outer stem portion of the valve 268 extends into a restricted passage 272 of the hollow stem 232, and cooperates therewith to perform a flow-closing function.

The main line downstream or control pressure is introduced through the bore 252 into the control pressure chamber 240. The main line upstream or operating pressure is communicated through the bore 262 and inlet passage 260 to the control chamber 258. The bore 242 is intended to communicate through a suitable conduit 274 with a suitable volume chamber 276, indicated diagrammatically, to provide means for increasing the available pressure equalizing time of such needle valves of conventional proportions as may be employed for use as the reset valve 250.

In practical operation, an increase in the downstream control pressure delivered to the chamber 240 will result in a small force tending to shift the yoke body 226 (upwardly relative to its orientation as shown in Figure 4). This response movement of the yoke body 226 will effect an opening of the passage 266 by the bleed valve 268 so as to permit the upstream pressure to flow from the operating chamber 258 into the pressure chamber 236, thereby raising the pressure level therein. The pressure within chamber 238, however, will remain lower than the pressure within chamber 236 because of the operation of the restriction valve 250. This will result in the exertion of an opposing force by the pressure within the chamber 236, counteracting the force of the increased control pressure within the chamber 240 and tending to shift the yoke body in the opposite direction to its initial movement (downwardly in Figure 4). In this way, any sudden changes in the control pressure are minimized so as to desensitize the pilot device to such changes.

In Figure 5 of the drawing I have illustrated another modified structural embodiment of the present invention, designated generally at 300. The pilot 300 performs its desensitizing action in the downstream or control pressure system, as the pilot 200 of Figure 4, but differs from the latter structurally in the use of four pressure response diaphragms. The pilot 300 comprises a main body 312, supplemental body members 314 and 316, an end body 318, and an end cover 320, all fixedly secured in assembled relation to provide a unitary valve body structure. The interconnected body members serve to fixedly secure four relatively large diaphragms 322, 324, 326 and 328. The effective operating areas of the diaphragms 324 and 326 are the same size, and slightly greater than the corresponding equal area sizes of the diaphragms 322 and 328.

A yoke body 330 and a supplemental assembly body 331 effect an interconnection of the diaphragms 322, 324 and 326 into a reciprocably movable assembly. A loading spring 332 provides a biasing force for the yoke body 330, and an adjustment bolt 334 permits selective variation thereof. A hollow plug 336 extends through the diaphragms 324 and 326 and into the yoke body 330. An apertured cap member 338 couples the diaphragm 328 to the plug 336. In this way, a plurality of separate pressure chambers 340, 342, 346 and 348 are defined intermediate the respective diaphragms 322 and 328. A vent bore 343 communicates the chamber 342 with atmosphere. The body member 316 is formed with threaded bores 350 and 352. The end body 318 is formed with a threaded bore 354, and the main body 312 is formed with a threaded bore 356. It should be noted that a cross section at right angles to Figure 5 would serve to reveal an additional threaded bore defining a loading pressure outlet from the chamber 340. A needle valve assembly 358 and a conduit 360 provide a regulated restricted flow connection between the pressure chambers 340 and 346. A conduit 362 also serves to communicate the chamber 346 with a volume tank 364, indicated diagrammatically, to increase the pressure equalizing time available from the needle valve 358. The yoke body 330 is formed with a transverse bore 366 to loosely receive a hollow stem 368. The stem 368 is fixedly disposed within the main body 312, and defines an operating chamber 370 and an inlet passage 372. A closure plug assembly 374 precludes fluid flow outwardly from the operating chamber 370 into the bore 366 and chamber 340 except through an outlet passage 376 regulated by a double-action intermittent bleed valve 378. A spring 380 serves to normally bias the valve 378 to a flow-closing position within the passage 376. The free stem end of the valve 378 effects seating engagement with a restricted passage 382 of a conduit 384 extending through the hollow plug 336 and cap 338 into the chamber 348.

The pressure within the chamber 340 represents the loading pressure to be delivered for regulating the operation of a main valve, in the same manner as the pilots 10 and 200 previously described. The main line upstream pressure is delivered through the inlet passage 372 to the operating chamber 370 within the hollow stem 368. The main line downstream or control pressure is delivered through the bore 354 into the control pressure chamber 348 and against the diaphragm 328. The net result of the loading pressure within the chamber 340 is a relatively small force (downwardly, as seen in the pilot orientation of Figure 5). The net force of the pressure within the chamber 346, which is connected by the needle valve 358 with the loading pressure in the chamber 340, is an opposing small force (upwardly in Figure 5). Since the opposing diaphragm effective areas are identical, the total net force of the opposing pressures in chamber 340 and 346 will be zero when the pressures are equalized therein. The main line downstream or control pressure within control pressure chamber 348, therefore, becomes the only pressure effective in positioning the internal valve parts against the bias of the loading spring 332, under the condition of equal pressures in chambers 340 and 346. The control pressure in chamber 348 will pass through the passages 384 and 382 into the chamber 340 when the valve 378 opens to permit such flow.

If a sudden increase in the downstream or control pressure occurs, there will be an immediate response against the diaphragm 328 to cause the yoke body to move (upwardly in Figure 5), thereby opening the valve 378 relative to the passage 376 and permitting the main line upstream pressure to bleed from the operating chamber 370 and into the pressure chamber 340 and effect an increase in the pressure therein. When the pressure in chamber 340 increases, the pressure in chamber 346 cannot immediately increase with it because of the restricting function of the needle valve 358. The resulting imbalance between the greater pressure in chamber 346 will serve to exert a net force tending to move the yoke body (downwardly as seen in Figure 5). This increased net force counteracts the sudden increase in the control pressure within chamber 348, and the net result is that the sudden change in the control pressure is minimized and the pilot is desensitized to that change.

It will be apparent, therefore, that each of the modified control devices 200 and 300 allows a more stable control of a main valve structure which is inherently more unstable to sudden change, while continuing to maintain a relatively narrow proportional band characteristic. The pilots 200 and 300 also serve to measure and supply the fluid power necessary to operate the main valve solely from the upstream main line pressures and without any auxiliary devices. The pilots also permit the bleeding of waste gas to the downstream main line system where that gas can be reused.

In Figure 6 of the drawing, I have illustrated a still further modification of the present invention, as embodied in a pilot device designated generally at 400. The pilot 400 comprises a valve body assembly including a center housing 412, a supplemental body member 414, and a pair of end covers 416 and 418, which serve to fixedly support three relatively large diaphragms 420, 422 and 424. A yoke body 426 is supported by the diaphragms 420 and 422 and is pressure loaded by spring 428 having an adjusting bolt 430. A hollow plug 432 and a closure plug 434 interconnect the diaphragm 424 with the yoke body 426. In this way, pressure chambers 436, 438 and 440 are defined intermediate the respective diaphragms.

The body member 414 defines threaded bores 442 and 444, and the body member 412 provides a suitable loading pressure outlet bore, not shown. The end cover 416 provides a chamber 446 and an inlet bore 448. A valve head plug 450 and a valve seat plug 452 are disposed at opposite ends of the chamber 446, and serve to co-operatingly support an elongated needle valve 454 within a bore 456 which communicates through a restricted opening 458 with the chamber 440. A closure stem 460 is threadedly received within the bore 456, and enables adjustment of the volume size thereof.

The yoke 426 is formed with a bore 462, through which a fixed hollow stem 464 extends. An operating chamber 466 and an inlet passage 468 are defined within the stem 464. A conduit 470 provides pressure flow communication between the bore 442 of chamber 438 and the bore 448 of chamber 446. An intermittent bleed valve 472 provides flow control between the chamber 466 and the chamber 440 through a bore 478 within the hollow plug 432. A closure plug 474 precludes flow outwardly of the chamber 466 except as controlled by the valve 472. A biasing spring 476 maintains the valve 472 in normally seated relation within the hollow stem 464. Bores 480 in the hollow plug 432 communicate the valve regulated flow through the bore 478 with the chamber 438.

The pilot 400 obtains a small thrust in response to an initial change in the downstream or control pressure by utilizing the net force resulting from differential diaphragm effective areas. The effective operating area of the center diaphragm 422 is slightly greater than the corresponding areas of the diaphragms 420 and 424 at each side thereof. The downstream control pressure is admitted to the control pressure chamber 438 through the bore 444. This pressure is transmitted through the bore 442 and conduit 470 to the bore 448 and chamber 446. The needle valve 454, in accordance with its position of adjustment, permits a controlled bleeding of the pressure through the restriction 458 to the chamber 440.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new and desire to secure by Letters Patent of the United States is:

1. A direct operated reset pilot for automatically controlling the operation of a pressure loaded valve in a main fluid flow line, said pilot comprising a hollow valve body having a plurality of movable wall members mounted in spaced relation therein to define an output pressure chamber, a volume pressure chamber, and a control pressure chamber, internal passage means providing flow communication between said output pressure chamber and said control pressure chamber, first inlet conduit means for admission of pressure fluid from the upstream side of a main fluid flow line into said output pressure chamber, second inlet conduit means for admission of pressure fluid from the downstream side of a main fluid flow line to said control pressure chamber, valve means operative in response to change in pressure within said control pressure chamber to control the admission of upstream and downstream pressure fluid from said first and second inlet conduit means into said output pressure chamber, and bleed flow means communicating said volume pressure chamber with one of said other pressure chambers for delayed pressure balance of said output pressure chamber in response to changes in pressure within said control pressure chamber.

2. A direct operated reset pilot for automatically controlling the operation of a pressure loaded valve in a main fluid line, said pilot comprising a hollow valve body having a plurality of movable wall members mounted in spaced relation therein to define an output pressure chamber, a volume pressure chamber, and a control pressure chamber, a body member carried by the movable wall members defining said output pressure chamber for movement therein, internal passage means providing flow communication between said output pressure chamber and said control pressure chamber, first inlet conduit means for admission of pressure fluid from the upstream side of a main fluid flow line into said output pressure chamber, second inlet conduit means for admission of pressure fluid from the downstream side of a main fluid flow line to said control pressure chamber, one of said body supporting wall members being responsive to change in pressure within said control pressure chamber to effect a pressure response movement of said body member in accordance therewith, valve means operative in response to movement of said body member to control the admission of upstream and downstream pressure fluid from said first and second inlet conduit means into said output pressure chamber, and bleed flow means communicating said volume pressure chamber with one of said other pressure chambers for delayed pressure balance of said output pressure chamber in response to changes in pressure within said control pressure chamber.

3. A direct operated reset pilot for automatically controlling the operation of a pressure loaded valve in a main fluid flow line, said pilot comprising a hollow valve body having a plurality of movable wall members mounted in spaced relation therein to define an output pressure chamber, a volume pressure chamber, and a control pressure chamber, a body member carried by the movable wall members defining said output pressure chamber for movement therein, resilient biasing means for pressure loading said body member, internal passage means providing flow communication between said output pressure chamber and said control pressure chamber, first inlet conduit means for admission of pressure fluid from the upstream side of a main fluid flow line into said output pressure chamber, second inlet conduit means for admission of pressure fluid from the downstream side of a main fluid flow line to said control pressure chamber, one of said body supporting wall members being responsive to change in pressure within said control pressure chamber to effect a pressure response movement of said body member in accordance therewith and in opposition to said resilient biasing means, valve means operative in response to movement of said body member to control the admission of upstream and downstream pressure fluid from said first and second inlet conduit means into said output pressure chamber, and bleed flow means communicating said volume pressure chamber with one of said other pressure chambers for delayed pressure balance of said output pressure chamber in response to changes in pressure within said control pressure chamber.

4. A direct operated reset pilot for automatically controlling the operation of a pressure loaded valve in a main fluid flow line, said pilot comprising a hollow valve body having a plurality of relatively fixed but resiliently deformable diaphragms mounted in spaced relation therein to define an output pressure chamber, a volume pressure chamber, and a control pressure chamber, a body member carried by a pair of said diaphragms defining said output pressure chamber for movement therein, internal passage means providing flow communication between said output pressure chamber and said control pressure chamber, first inlet conduit means for admission of pressure fluid from the upstream side of a main fluid flow line into said output pressure chamber, second inlet conduit means for admission of pressure fluid from the downstream side of a main fluid flow line to said control pressure chamber, one of said body supporting diaphragms being responsive to change in pressure within said control pressure chamber to effect a pressure response movement of said body member in accordance therewith, valve means operative in response to movement of said body member to control the admission of upstream and downstream pressure fluid frm said first and second inlet conduit means into said output pressure chamber, and bleed flow means communicating said volume pressure chamber with one of said other pressure chambers for delayed pressure balance of said output pressure chamber in response to changes in pressure within said control pressure chamber.

5. A direct operated reset pilot for automatically controlling the operation of a pressure loaded valve in a main fluid flow line, said pilot comprising a hollow valve body, a pair of movable wall members mounted within said valve body in spaced relation to define an output pressure chamber, a body member secured to said wall members for movement therewith, resilient biasing means for pressure loading said body member, a further movable wall member defining with one of said pair of wall members a volume pressure chamber, a control pressure chamber defined within said valve body at the side of said last named movbale wall opposite said volume chamber, internal passage means interconnecting said last named movable wall with said body member and providing flow communication between said output pressure chamber and said control pressure chamber, first inlet conduit means for admission of pressure fluid from the upstream side of a main fluid flow line into said output pressure chamber, second inlet conduit means for admission of pressure fluid from the downstream side of a main fluid flow line to said control pressure chamber, one of said pair of movable wall members being responsive to change in pressure within said control pressure chamber to effect a slight pressure response movement of said body member in accordance therewith and in opposition to said resilient biasing means, double-action valve means operative in response to movement of said body member to control the admission of upstream and downstream pressure fluid from said first and second inlet conduit means into said output pressure chamber, and bleed flow means communicating said volume pressure chamber with one of said other pressure chambers and having a flow restriction therein for desensitizing the pressure change within said output pressure chamber in response to changes in pressure within said control pressure chamber.

6. A direct operated reset pilot for automatically controlling the operation of a pressure loaded valve in a main fluid flow line, said pilot comprising a hollow valve body, a pair of movable wall members mounted within said valve body in spaced relation to define an output pressure chamber, a body member secured to said wall members for movement therewith, a further movable wall member defining with one of said pair of wall members a volume pressure chamber, a control pressure chamber defined within said valve body at the side of said last named movable wall opposite said volume chamber, internal passage means interconnecting said last named movable wall with said body member and providing flow communication between said output pressure chamber and said control pressure chamber, first inlet conduit means for admission of pressure fluid from the upstream side of a main fluid flow line into said output pressure chamber, second inlet conduit means for admission of pressure fluid from the downstream side of a main fluid flow line to said control pressure chamber, one of said pair of movable wall members being responsive to change in pressure within said control pressure chamber to effect a slight pressure response movement of said body member in accordance therewith, double-action valve means operative in response to movement of said body member to control the admission of upstream and downstream pressure fluid from said first and second inlet conduit means into said output pressure chamber, and bleed flow means communicating said volume pressure chamber with said control pressure chamber and having a flow restriction therein for desensitizing the pressure change within said output pressure chamber in response to changes in pressure within said control pressure chamber.

7. A direct operated reset pilot for automatically controlling the operation of a pressure loaded valve in a main fluid flow line, said pilot comprising a hollow valve body, a pair of movable wall members mounted within said valve body in spaced relation to define an output pressure chamber, a body member secured to said wall members for movement therewith, a further movable wall member defining with one of said pair of wall members a volume pressure chamber, a control pressure chamber defined within said valve body at the side of said last named movable wall opposite said volume chamber, internal passage means interconnecting said last named movable wall with said body member and providing flow communication between said output pressure chamber and said control pressure chamber, first inlet conduit means for admission of pressure fluid from the upstream side of a main fluid flow line into said output pressure chamber, second inlet conduit means for admission of pressure fluid from the downstream side of a main fluid flow line to said control pressure chamber, one of said pair of movable wall members being responsive to change in pressure within said control pressure chamber to effect a slight pressure response movement of said body member in accordance therewith, double-action valve means operative in response to movement of said body member to control the admission of upstream and downstream pressure fluid from said first and second inlet conduit means into said output pressure chamber, and bleed flow means communicating said volume pressure chamber with said output pressure chamber and having a flow restriction therein for desensitizing the pressure change within said output pressure chamber in response to changes in pressure within said control pressure chamber.

8. A direct operated reset pilot for automatically controlling the operation of a pressure loaded valve in a main fluid flow line, said pilot comprising a hollow valve body, a pair of movable wall members mounted within said valve body in spaced relation to define an output pressure chamber, a body member secured to said wall members for movement therewith, a further movable wall member defining with one of said pair of wall members a volume pressure chamber, a control pressure chamber defined within said valve body at the side of said last named movable wall opposite said volume chamber, internal passage means interconnecting said last named movable wall with said body member and providing flow communication between said output pressure chamber and said control pressure chamber, first inlet conduit means for admission of pressure fluid from the upstream side of a main fluid flow line into said output pressure chamber, second inlet conduit means for admission of pressure fluid from the downstream side of a main fluid flow line to said control pressure chamber, one of said pair of movable wall members being responsive to change in pressure within said control pressure chamber to effect a slight pressure response movement of said body member in accordance therewith, double-action valve means operative in response to movement of said body member to control the admission of upstream and downstream pressure fluid from said first and second inlet conduit means into said output pressure chamber, and bleed flow means communicating said volume pressure chamber with one of said other pressure chambers and having a flow restriction therein for desentizing the pressure change within said output pressure chamber in response to changes in pressure within said control pressure chamber.

References Cited in the file of this patent

UNITED STATES PATENTS

| | | |
|---|---|---|
| 2,618,286 | Johnson | Nov. 18, 1952 |
| 2,659,381 | Seljos | Nov. 17, 1953 |
| 2,755,032 | Justus | July 17, 1956 |
| 2,755,812 | Garnett | July 24, 1956 |
| 2,825,361 | Seljos | Mar. 4, 1958 |
| 2,864,399 | Hartz | Dec. 16, 1958 |

FOREIGN PATENTS

| | | |
|---|---|---|
| 544,543 | Great Britain | Apr. 22, 1942 |